United States Patent [19]
Pin et al.

[11] Patent Number: 5,095,403
[45] Date of Patent: Mar. 10, 1992

[54] LOW VOLTAGE SWITCHBOARD

[75] Inventors: Jean-Pierre Pin, St. Etienne de St. Geoirs; Pierre Vigne-Salade, St. Martin d'Heres; Hugues Berthet, Grenoble; Antoine Bedrossian, Biviers, all of France

[73] Assignee: Merlin-Gerin, France

[21] Appl. No.: 660,015

[22] Filed: Feb. 25, 1991

[30] Foreign Application Priority Data

Mar. 8, 1990 [FR] France .................... 90 03215

[51] Int. Cl.$^5$ .............................................. H02B 1/04
[52] U.S. Cl. ............................ 361/356; 361/391; 361/429
[58] Field of Search ............ 361/356, 338, 339, 355, 361/361, 390, 391, 399, 429

[56] References Cited

U.S. PATENT DOCUMENTS

| | | | |
|---|---|---|---|
| 4,215,386 | 7/1980 | Prager et al. | 361/390 |
| 4,920,453 | 4/1990 | Onose et al. | 361/392 |
| 4,972,298 | 11/1990 | Casa et al. | 361/391 |

FOREIGN PATENT DOCUMENTS

| | | |
|---|---|---|
| 0092774 | 11/1983 | European Pat. Off. |
| 2079459 | 10/1971 | France . |
| 2134726 | 8/1984 | United Kingdom . |

Primary Examiner—Gregory D. Thompson
Attorney, Agent, or Firm—Parkhurst, Wendel & Rossi

[57] ABSTRACT

A low voltage switchboard including on its front a conduit which houses enclosures containing printed circuit boards, which constitute indication and control interfaces of associated power devices, housed in adjacent superposed compartments.

8 Claims, 6 Drawing Sheets

LOW VOLTAGE SWITCHBOARD

BACKGROUND OF THE INVENTION

The invention relates to a low voltage electrical switchboard having electrical power devices, housed in superposed compartments accessible via the front panel of the switchboard and connected on the one hand to a supply busbar, located in a busbar compartment at the rear of the switchboard and on the other hand to outgoing cables located in customer-connected rear compartments.

Electrical power distribution in factories or large residential or office blocks requires different types of devices, notably circuit breakers, contactors, change-over switches or motor controls, and these devices are housed in low voltage switchboards. The requirements of these sectors are quite different and to meet them the switchboards are manufactured on request or in very small series. This increases manufacturing costs, notably to produce the auxiliary or wiring circuits which contain the power device control, indication and protection circuits. When an installation supplied by the switchboard is modified, for example when a local manual control device is replaced by a remote-control device, the auxiliary control and/or indication circuits have to be completely changed and the transformation is sometimes practically impossible when the available space is insufficient.

The object of the present invention is to achieve standardization of the auxiliary circuits by creating a power device indication and control interface, and of the connectors involved.

SUMMARY OF THE INVENTION

The switchboard according to the invention is characterized in that it comprises on the front panel, adjacent to the superposed compartments, a column in the form of a conduit with modular perforations, identical to those of the switchgear part, in which board guide enclosures are slotted and fixed each of which can accommodate, via the front, a printed circuit board, which constitutes an indication and/or control interface of the power device housed in the adjacent compartment at the same level as the board, which is securedly affixed to a front plate which blanks off the front of the enclosure in the plugged-in position of the board. The front plate or front panel of the board bears the associated indication and/or control devices.

Each device is connected by standard connectors to the associated enclosure and this enclosure accommodates a printed circuit board suited to the type of device. A limited number of boards enables most requirements to be met, and it is advantageous to use an identical printed circuit board for all the versions, customization or adaptation to the type of device controlled being achieved by fitting suitable components. Each board is fixed to a front panel bearing the control or indication devices corresponding to the board version, for example the off and on push-buttons of a motor supplied by a contactor, and the off, on or fault indicator lamps of this motor. The front panel and associated board can comprise only indication devices, for example tripping and/or fault, and/or making of an associated circuit breaker, or only on/off control devices with a remote control switch if applicable. Any combination is conceivable as are other control devices, for example with several speeds or alternating rotation direction of a motor, or several heating speeds. The front of the board is visible on the front part of the switchboard opposite the device controlled, which prevents any risk of confusion or error. Fixing of the board guide enclosures comprises two modular uprights enabling the guides to be fixed by screws at the height or level of the associated compartment. The height of the compartments is suited to the size of the device housed in this compartment. The unused part of the duct is advantageously used for other functions such as labels to be engraved or measuring devices. All the spare room is technically usable and remains fully standard and modulable. The same installation system can be used on cabinets of different heights or modularities, by associating with each board a label whose variable height makes up for the spacing difference. The label or measuring device, or the other devices are advantageously located above the board whose base is aligned with the base of the associated compartment.

Each compartment housing a power device is closed by an individual or common front door and a single compartment can contain several superposed devices. In this case, several boards are associated with a single compartment being staggered heightwise along the uprights to face the device controlled. The devices are fixed on compartment supports or back mounting plates with the handle accessible from the front after the door has been opened. The manual control by means of the handle can also be located on the door. It is clear that the invention is applicable to other types of switchboards or cabinets, for example with cabinets having compartments in the form of draw-out racks. The racks house electrical or electronic systems, such as contactors, circuit breakers, automatic controls or other control or power devices.

Each board is plugged into a backplane board or connector located at the rear of each enclosure and forming a plug-in terminal block. The opposite face of the backplane board bears terminal blocks for connectors for connection to the associated device, and/or to external remote indication or remote control circuits. The backplane board or backplane connector is a standard board or connector for all the board versions and the connectors are equipped with error preventers to prevent connection errors. There is fixed to one of the uprights, preferably to the upright fitted between the compartments and the conduit housing the board guide enclosures, a colored strip which extends over the whole height of the corresponding compartment and which is terminated at its base by an arrow opposite the corresponding label, so as to display without any risk of error the correspondence between the label and the device in the compartment. The strip and label can be fixed by any appropriate means, notably by slotting into a groove and/or sticking.

The front faces of the boards and the labels or blanking plates can be screwed onto the uprights, or clipped onto clips, themselves secured to the uprights by clipping.

The back of the switchboard comprises one or more doors giving access to power input and output compartments. In the input compartment there extends a vertical busbar supplying the power devices via connecting bars extending between the supports of these devices and the busbar. In the output or customer-connected compartment(s), the outgoing cable connecting terminal blocks are located, these terminal blocks being connected to the terminals of the power devices by conductors passing through an auxiliary power compartment, in which measuring and counting devices are housed. The customer wiring connections are preferably grouped on a connector housed in an adjacent compartment or common to the enclosure conduit, this compartment being accessible via a door located on the front or rear panel of the switchboard. This external connection compartment is completely separated from the power circuits and connections can be made on a live switchboard. The boards are protected by the board guides, generally made of metal and possibly by the partitions of the conduit securely united to the two uprights. The wiring connections can naturally be located at a different location of the switchboard if the space available on the front panel is insufficient. The location adjacent to the enclosure facilitates connection between the backplane boards and the customer connector or connection terminal block.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
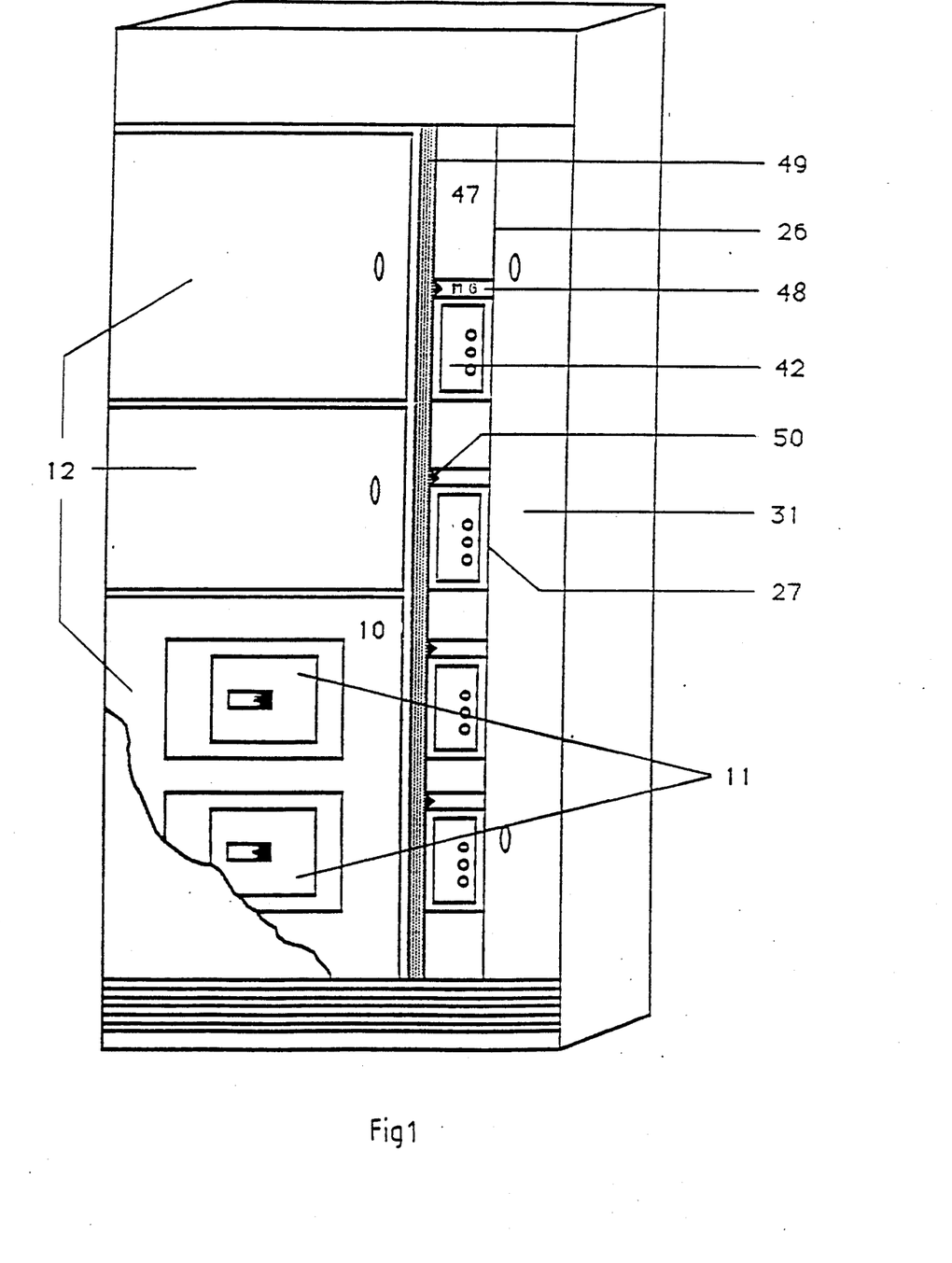
FIG. 1 is a schematic perspective view of a switchboard according to the invention, with one of the doors partially removed.
Figure 2:
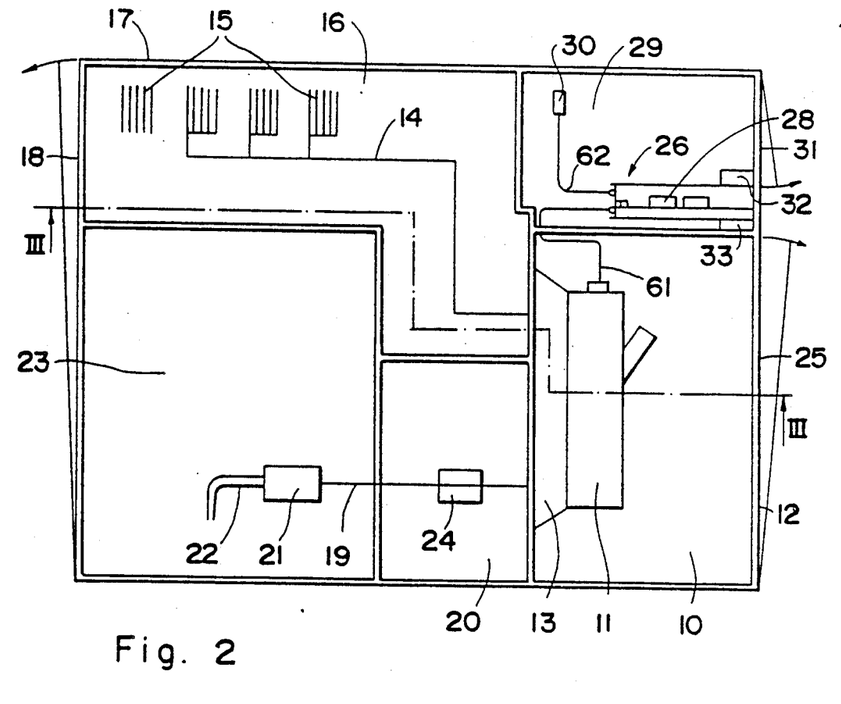
FIG. 2 is a plane view of the switchboard according to FIG. 1, with the upper panel being assumed to have been removed.
Figure 3:
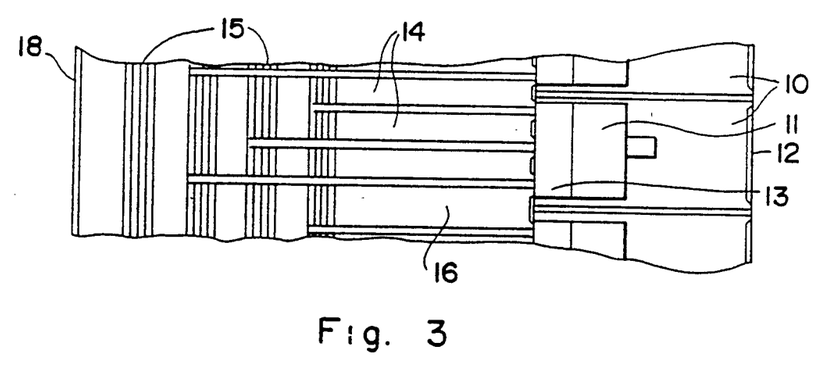
FIG. 3 is a cross-section along the broken line III—III of FIG. 2.
Figure 4:
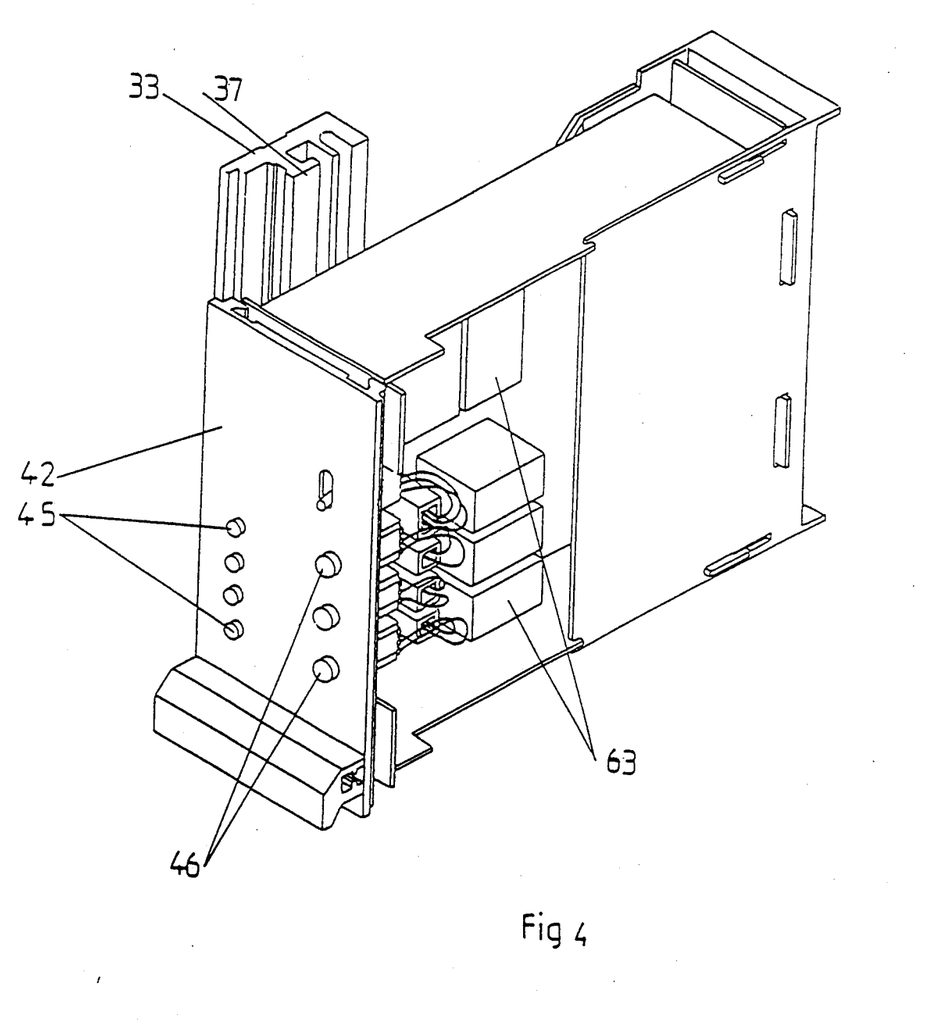
FIG. 4 is a schematic perspective view of a conduit housing the enclosure according to FIG. 2.
Figure 5:
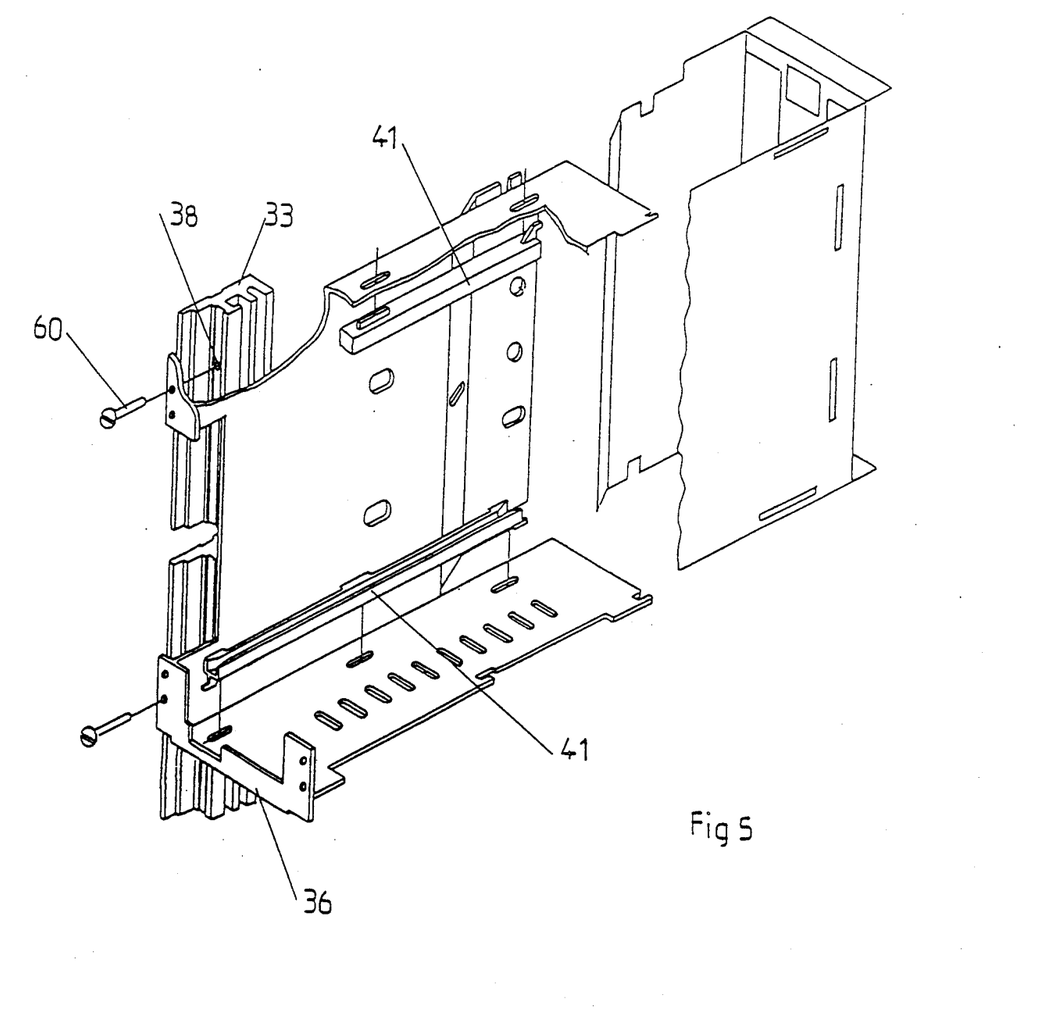
FIG. 5 is an exploded view of an enclosure according to FIG. 4, with certain parts removed.

In the figures, a low voltage switchboard in the form of a metal cabinet comprises a plurality of superposed compartments 10 accessible from the front of the cabinet, by opening doors 12 (FIG. 1). In each compartment 10 there is housed one or more electrical power devices 11, such as circuit breakers, contactors, changeover switches, two-speed motor control contactors and automatic starters by contactor. A single door 12 can be common to several compartments, or all the compartments can be accessible by opening a single door, located on the front of the cabinet. The power devices 11 are fixed to supports 13 securely united to the backplate of the switchgear compartments 10, and their input terminals are connected by conductors 14 in the form of bars, to a busbar 15 housed in a busbar compartment 16 adjacent to one 17 of the side panels 17 of the cabinet (FIGS. 2 and 3). The compartment 16 extends up to the rear panel 18, allowing access to this compartment 16 via the rear of the switchboard. The output terminals of the power devices 11 are connected by conductors 19 passing through an auxiliary compartment 20, to connecting strips 21 of outgoing cables 22, extending in one or more superposed customerconnected rear compartments 23. The compartment 23 is bounded by the rear panel 18 and connection of the outgoing cables 22 can be achieved from the rear of the cabinet after the panel 18 has been opened. In the auxiliary compartment 20 there are housed the measuring auxiliaries, such as current transformers. Closing of the switchgear device 11 which is for example a contactor, supplies power to the load connected to the outgoing cable 22, the load being for example a pump motor or any other load. A single cabinet can naturally comprise different types of switchgear, suited to the loads supplied, this type of switchboard being particularly suitable for factories or large residential or office blocks. Next to the superposed power compartments 10 there extends, facing the front panel 25 of the cabinet, a column in the form of a conduit 26 capable of housing metal enclosures 27, into which printed circuit boards 28 are plugged. In the embodiment illustrated by the figures (FIG. 2), the conduit 26 is fitted between the superposed power compartments 10 and a customer wiring connection compartment 29, but it can be located in the latter compartment 29. In the compartment 29 there extends a connector 30 for external connection of the remote control and/or remote indication conductors. The compartment 29 opens onto the front of the cabinet, closed by a door 31. The access door to the wiring connection compartment 29 can also be located on the side panel 17 when the latter is accessible, or on another panel.

Figure 6:
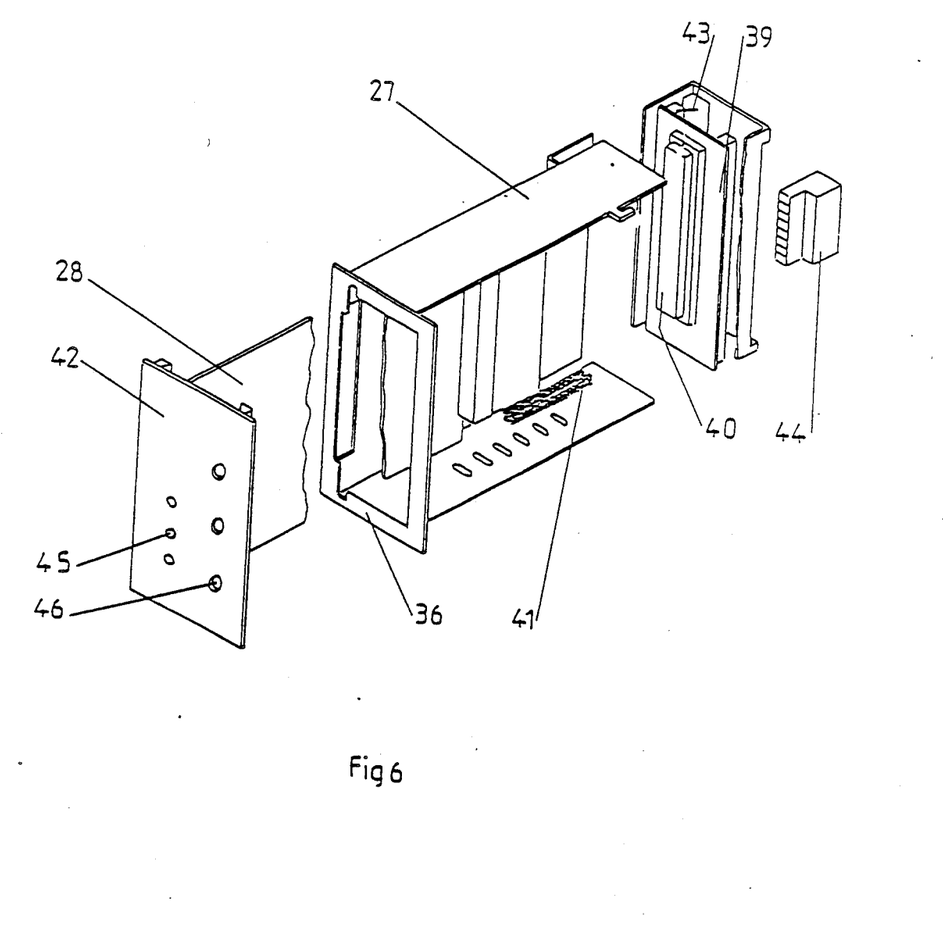
FIG. 6 is an exploded perspective view of the enclosure with the board and backplane board.
Figure 7:
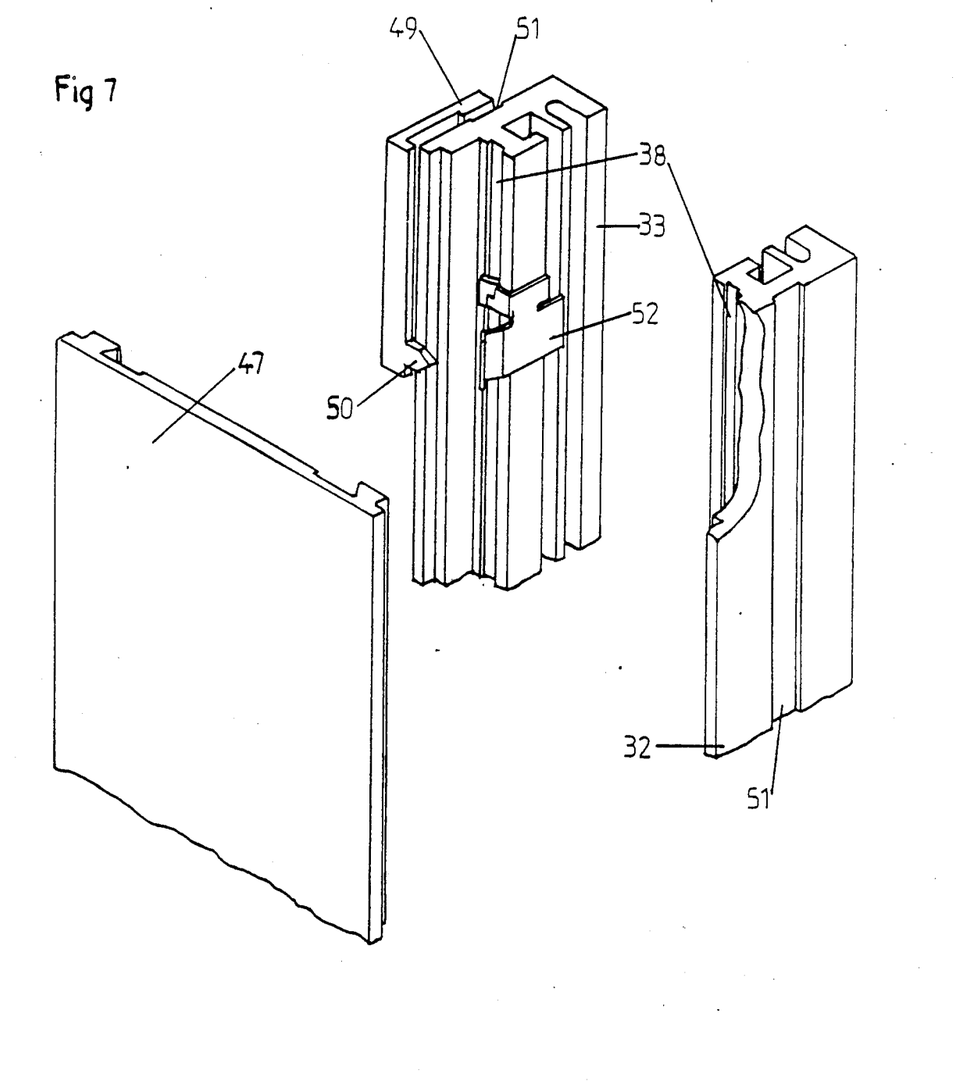
FIG. 7 is a perspective view of the two uprights of the conduit according to FIG. 4 illustrating the cover plate fixing and marking strip mode.

Referring more particularly now to FIGS. 4 to 7, it can be seen that the conduit 26 is bounded laterally by two profiled uprights 32, 33 adjacent to the front panel 25 of the cabinet. The two profiled uprights 32, 33 extend over the whole height of the cabinet. They can be extended towards the rear by plates (not shown) which then form with the uprights 32, 33 the side walls of a closed conduit 26. The distance between the uprights 32, 33 corresponds to the width of the enclosures 27 which can be fitted in the conduit 26. Each enclosure 27 is parallelipiped-shaped and has on its front face a frame 36 which in the fitted position of the enclosure 27 comes up against edges 37 of the uprights 32, 33, being affixed thereto by screws 60 screwed into the perforations 38 provided on the uprights 32, 33, (FIG. 5) according to the modularity of the system, and the height of the enclosure 27 corresponds to three modules. The value of the module can naturally be different. In the back of the enclosure 27 made of folded sheet metal, there is located a backplane connector 39 which bears, on the internal face of the enclosure 27, a plug-in terminal block 40 for plugging-in of printed circuit board 28 (FIG. 6). The board 28 can be inserted in the enclosure 27 via the open front frame 36, and this board guided by fixed guides 41 plugs at the end of its travel into the terminal block 40 of the backplane connector. The opposite front edge of the board 28 is securely united to a rectangular front panel 42 which comes up against the frame 36 at the end of plug-in travel. The backplane connector 39 bears on its opposite side to the board 28, terminal blocks 43 which can receive wiring connectors 44. The terminal blocks 40 and 43 are naturally connected by internal connections, in a well-known manner. Some of the connectors 44 are connected by wires 61 to the associated switchgear device 11, and other connectors 44 are connected by conductors 62 to the external connector 30. All the circuitry and indication and control components of the power device 11 are located on the board 28. The front panel 42 of the board 28 bears indication 45 and/or control devices 46. The internal partitioning of the cabinet is made of sheet metal and the electronic circuitry of the board 28 is in addition protected by the metal enclosure 27 and conduit 26. The boards 28 all carry a standard printed circuit, customization, i.e. adaptation to the associated power device 11, being achieved by fitting suitable components 63 on the board. Three types of boards are generally sufficient to cover the range of electrical power devices 11 used in cabinets of this kind, the number naturally being able to be greater when additional functions are provided. The front panel 42 is also adapted to the type of boards 28, the three standard front panels being for example a front panel having only indication devices 45 in the form of light-emitting diodes indicating for example opening, closing and/or tripping of a circuit breaker 11. Another type of front panel comprises the same three indication devices 45 and two control devices 46, for example two push-buttons controlling closing and opening of the circuit breaker or contactor controlled. A third type of board has on its front panel 42 four indication devices 45 and three push-buttons 46, one of these buttons controlling for example forward running of a motor, and the other reverse running. The latter two types of board can have corresponding to them two additional identical boards but with a switching device for a remote control. This range of boards is given as an example, and it is clear that any other combination is conceivable.

The board 28 constitutes an interface between the power device 11 and the local control devices 46 and/or remote control devices connected to the external connector 30. The same board 28 constitutes an indication interface between the power device 11 and the local indication devices 45 and/or remote indication devices, connected to the external connector 30. The boards 28 with their front panels 42 are interchangeable by simply unplugging and a modification, for example addition of a remote control, is achieved by simply changing the board 28. Error preventers prevent incompatible boards from being fitted.

It is important to be able to visualize, on the front of the cabinet, the front panel 42 corresponding to the device controlled, and to this end the enclosure 27 is disposed in such a way that the base of the enclosure is flush with the base of the compartment 10 housing the associated power device 11. The modularity of the system allows such a fixing and the parts of the conduit 26 which are not occupied by the enclosures 27 are blanked off by cover plates 47. The cabinets are naturally of the modular type and when this modularity corresponds to that of the uprights 32, 33, it is easy to locate the enclosures 27 facing the base of the compartments 10. The same uprights 32, 33 can be fitted to cabinets of different modularity making up for the difference in spacing by using labels 48, preferably placed above the enclosure 27. It is naturally possible to provide label heights corresponding exactly to the modularity difference, but a limited number of labels is generally sufficient to make up for these differences. The label bears the indications relating to the power device controlled and possibly the manufacturer's identifications.

According to a development of the invention, the marking is improved by fixing a strip 49 at the edge of the compartment 10, extending over the whole height of the compartment. The strip 49 is terminated by an arrow 50 pointing to the corresponding label 48. The strip 49 and label 48 are of a suitable color showing clearly that the label 48 and of course the enclosure 27 located below this label 48, correspond to the device 11 housed in the compartment 10 facing the strip 49. The strip 49 can be positioned by slotting into a groove 51 provided in the upright 33 adjacent to the superposed compartment 10, fixing being able to be achieved by simple sticking. The labels 48 can be fixed by screws screwed into the perforations 38 of the uprights 32, 33 or preferably in the manner illustrated in FIG. 7, by clipping onto clips 52 clipped onto the edges of the uprights 32, 33. The cover plates 47 are fixed in the same manner by clipping or screwing onto the uprights 32, 33 to allow possible disassembly and addition of an additional enclosure 27 or adaptation in case the cabinet partitioning is changed.

The connectors 61 between the terminal blocks 27 and power devices 11 are standard, as are the connectors 62 between the terminal blocks 27 and the external connector 30. A limited number of interchangeable boards 28 enables all the control and indication requirements of the power devices 11 to be met, which enables this type of switchboard, and its connectors, to be standardized.

It is clear that the installation system of the enclosures 27 on the two uprights 32, 33 can be used on other types of cabinets. The conduit 26 can for example be bracketed to a section of the cabinet framework, on the inside or outside, or be housed at any suitable location available in a cabinet. The local control is located on the front panel 42 but the manual control of the device 11 remains accessible after the door of the compartment 10 has been opened. The devices 11 can be of the withdrawable type, which makes fitting easier, and the height of each compartment is adapted to the type of device housed in this compartment.

The system is applicable to all types of switchboards, notably to those having superposed racks housing the power devices 11, these racks constituting the compartments 10 and the devices then being preferably withdrawable by opening the rack.

We claim:
1. A low voltage electrical switchboard comprising:
a housing having a front panel and a rear panel;
a plurality of superposed compartments accessible via said front panel of the switchboard;
electrical power devices housed in said superposed compartments;
a busbar compartment located in close proximity to said rear panel of the switchboard for supplying power to said electrical power devices;
outgoing cables connecting said electrical power devices to a plurality of superposed rear compartments;
conduit means generally forming a column and having a modular construction, said conduit means being located in close proximity to said front panel such that a vertical portion of said conduit means is accessible via said front panel;
a plurality of enclosures arranged in superposition in said conduit means;
printed circuit board means fixed in said enclosures for providing an indication and/or control interface to the corresponding electrical power devices, each said printed circuit board means being located at approximately a same vertical position as the corresponding electrical power device within the housing; and indicator panels containing indication and/or control devices for providing a customer interface to said printed circuit board means and thereby an interface to said electrical power devices, said indicator panels being arranged on a front portion of said enclosures.

2. The switchboard according to claim 1, wherein said conduit means comprises two uprights, each comprising a plurality of perforations arranged vertically along said uprights, said enclosures being arranged vertically along said two uprights and spaced according to locations of said perforations.

3. The switchboard according to claim 2, wherein said printed circuit board means bear a standard printed circuit and are customized by mounting suitable components thereon and by using a corresponding indicator panel.

4. The switchboard according to claim 3, wherein each enclosure comprises a backplane connector having, on one side thereof, a plug-in terminal block for connection to said circuit board means housed in a corresponding said enclosure, and, on the opposite side thereof, a terminal block for connection of wiring connections to a corresponding said electrical device and/or to an external device via an external connector.

5. The switchboard according to claim 1, wherein a modular label identifying the characteristics of a particular electrical power device is fixed to said conduit means above said indicator panel corresponding to said particular electrical power device.

6. The switchboard according to claim 5, wherein a difference between a combined height of said plurality of superposed compartments and a combined height of said plurality of said enclosures is compensated by labels of suitable height.

7. The switchboard according to claim 2, wherein one of said uprights has a groove formed therein, and arranged in said groove is at least one component supporting a marking arrow.

8. The switchboard according to claim 1, wherein said conduit means housing said enclosures is fitted between said superposed compartments and a compartment housing an external connector.

* * * * *